(12) United States Patent
Hovis et al.

(10) Patent No.: US 9,952,117 B2
(45) Date of Patent: *Apr. 24, 2018

(54) METHODS FOR DETERMINING STRAIN ON TURBINE COMPONENTS USING A PLURALITY OF STRAIN SENSOR REFERENCE FEATURES

(71) Applicant: General Electric Company, Schenectady, NY (US)

(72) Inventors: Gregory Lee Hovis, Martinez, GA (US); John David Ward, Jr., Woodruff, SC (US); William Farris Ranson, Columbia, SC (US)

(73) Assignee: General Electric Company, Schenectady, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/633,557

(22) Filed: Feb. 27, 2015

(65) Prior Publication Data

US 2016/0252417 A1 Sep. 1, 2016

(51) Int. Cl.
 *G01M 5/00* (2006.01)
(52) U.S. Cl.
 CPC .......... *G01M 5/0016* (2013.01); *G01M 5/005* (2013.01); *G01M 5/0091* (2013.01)
(58) Field of Classification Search
 CPC ..... G01L 5/161; G01M 5/0016; G01M 5/005; G01M 5/0091
 USPC .................... 73/862.045, 800, 660, 659, 773
 See application file for complete search history.

(56) References Cited

U.S. PATENT DOCUMENTS

| | | | |
|---|---|---|---|
| 3,535,920 A | 10/1970 | Bernaix | |
| 4,428,713 A * | 1/1984 | Coplin | .................... F01D 25/08 |
| | | | 415/116 |
| 6,748,112 B1 | 6/2004 | Nguyen et al. | |
| 6,985,238 B2 | 1/2006 | Isaacs et al. | |
| 7,231,320 B2 | 6/2007 | Papadimitriou et al. | |
| 7,664,608 B2 | 2/2010 | Urano et al. | |
| 7,975,554 B2 * | 7/2011 | Berkcan | ................... G01B 7/16 |
| | | | 73/773 |

(Continued)

FOREIGN PATENT DOCUMENTS

WO 2010111230 A1 9/2010
WO 2011112391 A1 9/2011

OTHER PUBLICATIONS

European Search Report and Opinion issued in connection with Related EP Application No. EP16155736.8 dated Apr. 8, 2016.

*Primary Examiner* — Manish S Shah
*Assistant Examiner* — Suman K Nath
(74) *Attorney, Agent, or Firm* — Ernest G. Cusick; Frank A. Landgraff

(57) ABSTRACT

Methods for determining strain on turbine components include providing a turbine component comprising a plurality of strain sensor reference features disposed along the turbine component separated from one another by a plurality of first distances at a first time, reading the plurality of strain sensor reference features at a second time to determine a plurality of second distances between the plurality of strain sensor reference features, and comparing the plurality of second distances to the plurality of first distances to determine a plurality of non-linear strain measurements between the plurality of strain sensor reference features.

13 Claims, 4 Drawing Sheets

(56) References Cited

U.S. PATENT DOCUMENTS

| | | | | |
|---|---|---|---|---|
| 8,004,423 B2* | 8/2011 | Mitchell | ............... | F01D 5/288 340/573.4 |
| 8,757,003 B1* | 6/2014 | Makaremi | ........... | G01M 5/0016 73/847 |
| 8,773,514 B2 | 7/2014 | Gharib et al. | | |
| 8,818,078 B2 | 8/2014 | Telfer et al. | | |
| 2003/0125890 A1* | 7/2003 | Nagamatsu | ............. | H04Q 9/00 702/77 |
| 2011/0081229 A1* | 4/2011 | Kottilingam | ....... | B23K 26/0626 415/118 |
| 2011/0214508 A1* | 9/2011 | Volanthen | ............ | F03D 1/0675 73/800 |
| 2013/0280070 A1* | 10/2013 | Lindby | ................. | F03D 1/065 416/61 |

\* cited by examiner

METHODS FOR DETERMINING STRAIN ON TURBINE COMPONENTS USING A PLURALITY OF STRAIN SENSOR REFERENCE FEATURES

BACKGROUND OF THE INVENTION

The subject matter disclosed herein relates to strain sensors and, more specifically, to methods and devices for determining strain on turbine components for high temperature applications.

In gas turbine engines, such as aircraft engines for example, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures may depend in part one or more protective coatings and/or on supplying a cooling air to the outer surfaces of the metal parts through various methods. The metal parts of these engines that are particularly subject to high temperatures, and thus require particular attention with respect to cooling, are the metal parts forming combustors and parts located aft of the combustor.

Moreover, the turbine components may experience stress and/or strain from various forces over its operational lifecycle. While various tools may be utilized to measure imparted stress and strain in relatively standard environments, the turbine components in turbine engines may experience hotter and/or more corrosive working conditions that may be unsuitable for such measurement tools. Moreover, any potential strain may vary from location to location. Therefore, merely measuring a change of distance between only two points may provide limited data on any actual strain locations within that region.

Accordingly, alternative methods and devices for determining strain on turbine components for high temperature applications would be welcome in the art.

BRIEF DESCRIPTION OF THE INVENTION

In one embodiment, a method for determining strain on a turbine component is disclosed. The method includes providing the turbine component comprising a plurality of strain sensor reference features disposed along the turbine component separated from one another by a plurality of first distances at a first time, reading the plurality of strain sensor reference features at a second time to determine a plurality of second distances between the plurality of strain sensor reference features, and comparing the plurality of second distances to the plurality of first distances to determine a plurality of non-linear strain measurements between the plurality of strain sensor reference features.

In another embodiment, a turbine component is disclosed. The turbine component comprises an exterior surface; and a plurality of strain sensor reference features disposed on the exterior surface of the turbine component separated from one another by a plurality of first distances at a first time, wherein the plurality of strain sensor reference features may become separated from one another by a plurality of second distances at a second time to a provide plurality of non-linear strain measurements.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
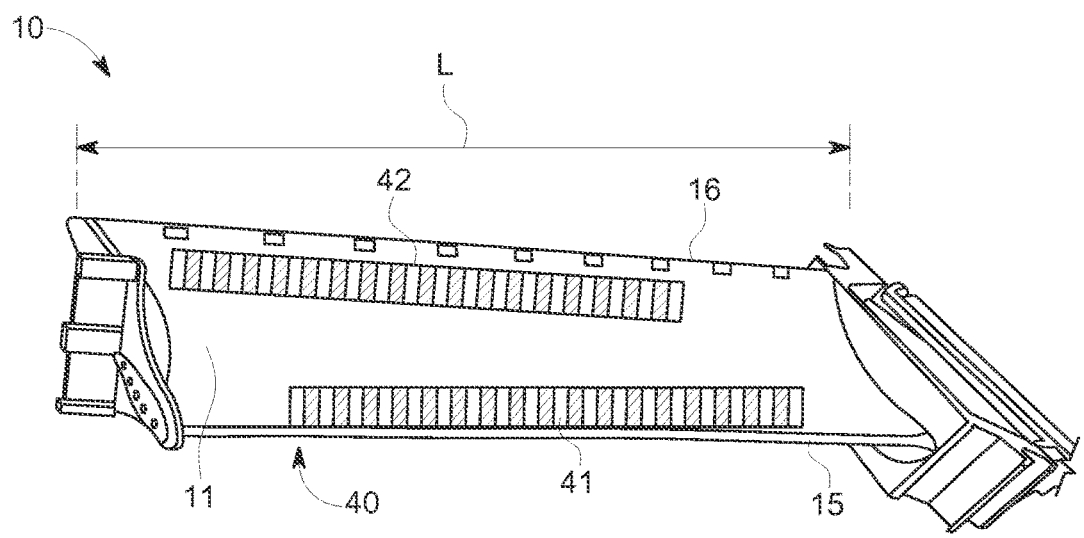
FIG. 1 is an exemplary turbine component comprising a plurality of strain sensor reference features according to one or more embodiments shown or described herein.

Referring now to FIG. 1, a turbine component 10 is illustrated with a plurality of strain sensor reference features 40 disposed on a portion of the exterior surface of the turbine component 10.

The turbine component 10 can comprise a variety of specific components such as those utilized in high temperature applications (e.g., components comprising nickel or cobalt based superalloys). For example, in some embodiments, the turbine component 10 may comprise a combustion component or hot gas path component. In some particular embodiments, the turbine component 10 may comprise a bucket, blade, vane, nozzle, shroud, rotor, transition piece or casing. In other embodiments, the turbine component 10 may comprise any other component of a turbine such as a component for a gas turbine, industrial gas turbine, steam turbine or the like.

The turbine component 10 can comprise an exterior surface 11 with or without one or more additional coatings disposed thereon. As should be appreciated herein, the exterior surface 11 may comprise one or more areas suitable for the location of the plurality of strain sensor reference features 40 for the subsequent capturing of strain measurements. These areas may comprise a variety of materials and locations depending in part, for example, on the material and deposition method of the plurality of strain sensor reference features 40. For example, the areas may comprise a bare surface of the turbine component's base material (e.g., alloy, ceramic or the like) or may comprise one or more coatings (e.g., thermal barrier coating) disposed thereon.

Figure 2:
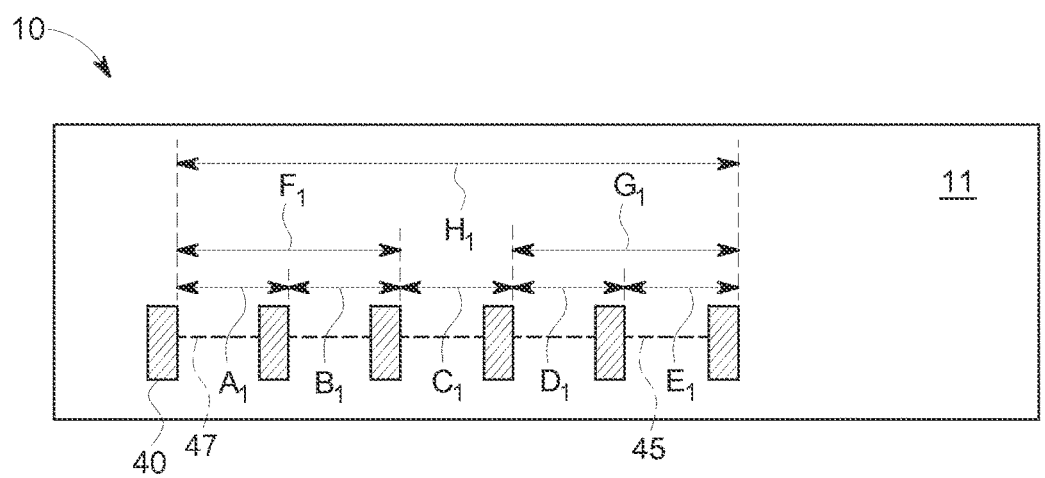
FIG. 2 is an exemplary plurality of strain sensor reference features at a first time according to one or more embodiments shown or described herein.
Figure 3:
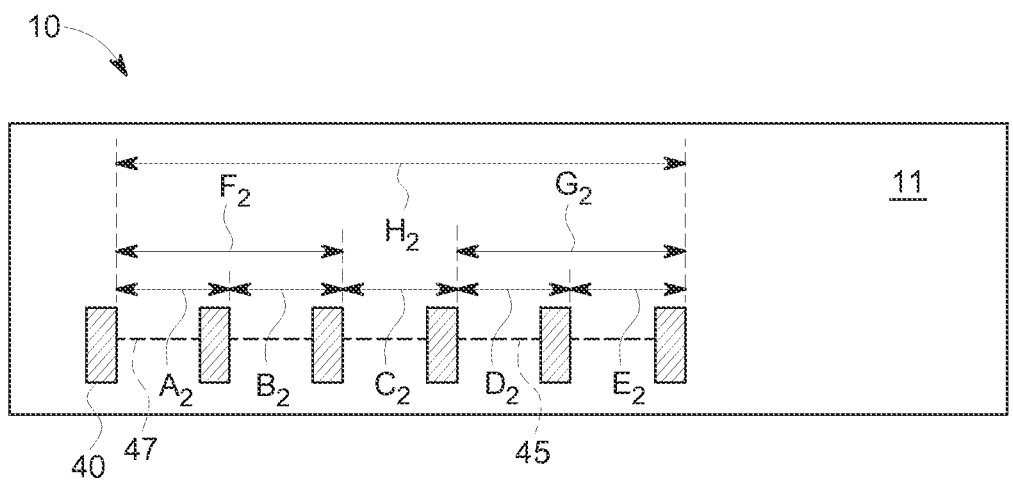
FIG. 3 is cross section of the exemplary plurality of strain sensor reference features illustrated in FIG. 2 at a second time according to one or more embodiments shown or described herein.

Referring now to FIGS. 1-3, the plurality of strain sensor reference features 40 generally comprise a plurality of identifiable features separated from one another by a plurality of distances A-H (e.g., first distances $A_1$-$H_1$ at a first point in time). Over time, such as after the turbine component 10 is utilized in turbine operation, the plurality of distances may change (e.g., second distances $A_2$-$H_2$ at a second point in time).

The plurality of strain sensor reference features 40 can comprise any suitable combination of material(s) and shape(s) that allow for the reading (i.e., identification) of their respective locations for determining the plurality of distance A-H between the plurality of strain sensor reference features 40 at a plurality of time intervals. Moreover, the plurality of strain sensor reference features 40 may be readable through any suitable mechanism such as, for example, optical recognition (e.g., visually contrasting material), physical recognition (e.g., ridges, bumps or the like), or the utilization of waves and/or emission based technologies (e.g., RFID, magnetic fields).

For example, in some embodiments, the plurality of strain sensors reference features 40 may comprise a ceramic material that may provide increased temperature survivability compared to other strain sensor materials. In some embodiments, the ceramic material may comprise a thermal barrier coating such as yttria-stabilized zirconia (also referred to as YSZ). In such embodiments, the YSZ may comprise, for example, YSZ-D111. In even some embodiments, the plurality of strain sensor reference features 40 may comprise a metallic bond coat and/or thermally grown oxide to assist in the deposition of the ceramic top coat (e.g., YSZ). While some particular turbine components 10 (or at least particular locations thereon) may not experience the elevated temperatures to require thermal barrier coatings, such utilization for the plurality of strain sensor reference features 40 may ensure its longevity where other strain sensor materials (e.g., polymeric materials, chemical dyes, etc.) could potentially break down and disappear from the relatively harsh environment.

In such embodiments, the ceramic material may be deposited using any type of deposition apparatus suitable for depositing with high enough precision to form the plurality of strain sensor reference features 40 as should be appreciated herein. For example, in some embodiments, the deposition apparatus for depositing the ceramic material may comprise an aerosol jet coater (e.g., Aerosol Jen and LENS systems from Optomec), Micro Dispensing Machine (e.g., Micropen or 3Dn from Ohcraft, Inc. or nScrypt, Inc.), MesoPlasma from MesoScribe Technologies, Inc., plasma spray, or any other suitable apparatus or combinations thereof.

In some embodiments, the strain sensor 40 may comprise a visually contrasting material in addition to the ceramic material 30. The visually contrasting material can refer to any material that visually contrasts with the ceramic material such as through different colors or patterns. The visually contrasting material may help facilitate identification of the plurality of strain sensor reference features 40 by visually highlighting their locations for an operator and/or machine. The visually contrasting material may comprise any additional metal, alloy, ceramic or the like that can similarly survive on the turbine component 10 during operation. For example, in some embodiments, the visually contrasting material may comprise a doped version of the ceramic material that changes its color.

In some embodiments, the visually contrasting material may be uniformly deposited onto a portion of the exterior surface 11 of the turbine component 10 prior to the deposition of the ceramic material comprising the plurality of strain sensor reference features 40. Such embodiments may allow for the visually contrasting material to be seen through the negative space between portions of the ceramic material. In some embodiments, the visually contrasting material may be deposited directly within the negative space 47 between the plurality of strain sensor reference features 40 (i.e., between portions of the ceramic material) such that the ceramic material and the visually contrasting material form one substantial layer.

In some embodiments, the plurality of strain sensor reference features 40 may comprise any other detectable type of characteristic that sets it apart from the turbine component 10. For example, the strain sensor reference features 40 may comprise a different height, roughness, pattern or the like, may emit distinct energy (e.g., magnetic field, photoluminescence, radiation, etc.), or may comprise any other differentiating characteristic compared to the turbine component 10. These and similar embodiments may facilitate the identification of, and measurements between, the plurality of strain sensor reference features 40 such as through surface metrology, energy emission analysis or the like.

Moreover, the plurality of strain sensor reference features 40 may comprise a variety of shapes. For example, in some embodiments, the plurality of strain sensor reference features 40 may comprise a plurality of boxes as illustrated in FIGS. 1-3 and 5. In some embodiments, the plurality of strain sensor reference features may additionally or alternatively comprise dots, lines, circles, boxes or any other geometrical or non-geometrical shape so long as they are consistently identifiable and may be used to measure the plurality of distances A-H there between.

The plurality of strain sensor reference features 40 can thereby comprise a variety of configurations to facilitate the measurement of non-linear strain. Specifically, the plurality of strain sensor reference features 40 may facilitate the measurement of a plurality of distances A-H between a plurality of strain sensor reference features 40 such that any change of distance may be determined for a combination of relatively localized and relatively globalized measurements as should be appreciated herein. This combination of measurements may allow for both an acute analysis of strain at one or more finite locations while also enabling a broader scale analysis of strain across greater distances.

In some embodiments, the plurality of strain sensor reference features 40 may comprise at least four strain sensor reference features 40. In such embodiments, the at least four strain sensor reference features 40 may facilitate at least three non-linear strain measurements to provide a non-linear strain analysis for all or part of the overall distance separating the strain sensor reference features 40. However, in some embodiments, the plurality of strain sensor reference features 40 may comprise even more individual strain sensor reference features 40 such as 10, 20 or even more strain sensor reference features 40. Such embodiments can facilitate an even greater number of non-linear strain measurements for a more detailed strain analysis over a similar area and/or a larger strain analysis over a larger area.

As best illustrated in FIG. 1, the plurality of strain sensor reference features 40 may be disposed across an extended portion of the turbine component 10. Such embodiments can ensure that a non-linear strain analysis may be performed over a significant portion of the turbine component 40. For example, in some embodiments, the plurality of strain sensor reference features 40 may be disposed along at least 50% of a length L of the turbine component 40. In some embodiments, the plurality of strain sensor reference features 40 may be disposed along at least 60%, at least 70% or more of the length L of the turbine component 40. Alternatively, the plurality of strain sensor reference features 40 may be disposed along at least a certain percentage (e.g., 50%, 60%, 70% or more) of an individual section of the turbine components, such as an airfoil section or the like.

With reference to FIGS. 1-3 and 5, the plurality of strain sensor reference features 40 may be disposed in one or more predetermined paths 45. The predetermined path 45 can establish the area for analysis for future non-linear strain measurements. Accordingly, the predetermined path 45 may comprise a linear or a non-linear predetermined path 45 and may depend in part on the specific turbine component 40, the desired location for strain analysis, or other operation parameters. For example, the predetermined path 45 may be substantially parallel to an edge (e.g., trailing edge 15 and/or a leading edge 16) of the turbine component 10. Moreover, in some embodiments, the plurality of strain sensor reference features 40 may at least initially be substantially uniformly distributed along the predetermined path 45. In other embodiments, the plurality of strain sensor reference features 40 may be initially non-uniformly distributed along the predetermined path 45. The selection of such distribution may be determined, for example, at least in part on highlighting one or more select areas for increased strain analysis with respect to other areas.

In some embodiments, the turbine component 10 may comprise at least a first set 41 of strain sensor reference features 40. The first set 41 may be disposed at any suitable location and for any suitable distance to facilitate non-linear strain analysis. In even some embodiments, the turbine component 10 may additionally comprise at least a second set 42 of strain sensor reference features 40 disposed at any second suitable location and for any suitable distance to facilitate non-linear strain analysis. Turbine components 10 comprising a plurality of sets 41 and 42 of strain sensor reference features 40 may facilitate non-linear strain analysis at a greater variety of locations via a plurality of predetermined paths 45 (such as both the leading edge 16 and trailing edge 15 of the turbine component 10).

Accordingly, the plurality of strain sensor reference features 40 may thereby be deposited in one or more of a variety of locations of various turbine components 10. For example, as discussed above, the plurality of strain sensor reference features 40 may be deposited on a bucket, blade, vane, nozzle, shroud, rotor, transition piece or casing. In such embodiments, the plurality of strain sensor reference features 40 may be deposited in one or more locations known to experience various forces during unit operation such as on or proximate airfoils, platforms, tips or any other suitable location. Moreover, since the plurality of strain sensor reference features 40 may comprise a ceramic material or other heat resistant material, the plurality of strain sensor reference features 40 may be deposited in one or more locations known to experience elevated temperatures (wherein strain sensors comprising other materials may corrode and/or erode). For example the plurality of strain sensor reference features 40 comprising ceramic material may be deposited on a hot gas path or combustion turbine component 10.

In even some embodiments, a plurality of strain sensor reference features 40 may be deposited on a single turbine component 10 or on multiple turbine components 10. For example, a plurality of strain sensor reference features 40 may be deposited on a single turbine component 10 (e.g., a bucket) at various locations such that the non-linear strain may be determined at a greater number of locations about the individual turbine component 10. Alternatively or additionally, a plurality of like turbine components 10 (e.g., a plurality of buckets), may each have a plurality of strain sensor reference features 40 deposited along one or more standard predetermined paths so that the amount of strain experienced by each specific turbine component 10 may be compared to other like turbine components 10. In even some embodiments, multiple different turbine components 10 of the same turbine unit (e.g., buckets and vanes for the same turbine) may each have a plurality of strain sensor reference features 40 deposited thereon so that the amount of strain experienced at different locations within the overall turbine may be determined.

After the turbine component 10 is utilized in operation over a period of time, it may experience various levels of strain at one or more locations. Using the plurality of strain sensor reference features 40, a plurality of non-linear strain measurements may be realized by comparing a change between a plurality of first distances $A_1$-$H_1$ and a plurality of second distances $A_2$-$H_2$. For example, with specific reference to FIGS. 2 and 3, a turbine component 10 is illustrated comprising a plurality of strain sensor reference features 40 separated by a plurality of distances A-H that can change over time.

Specifically, FIG. 2 illustrates the turbine component 10 with the plurality of strain sensor reference features 40 separated by a plurality of first distances $A_1$-$H_1$ at a first time. As discussed above, the plurality of strain sensor reference features 40 may be substantially uniformly distributed along a predetermined path 45 as illustrated. Moreover, the plurality of strain sensor reference features 40 can facilitate both local and broad measurements. For example, measurements directly between adjacent strain sensor reference features 40 (e.g., A-E) can facilitate a local view of strain. Conversely, measurements across broader areas (e.g., F-G) can facilitate a broader view of strain across a greater distance. These variations can provide a subsequent non-linear strain analysis by providing a plurality of measurements over a plurality of different distances.

Likewise, FIG. 3 illustrates the turbine component 10 with the plurality of strain sensor reference features 40 separated by a plurality of second distances $A_2$-$H_2$ at a second time. Due to various parameters, such as specific turbine operating conditions, one or more of the plurality of second distances $A_2$-$H_2$ may differ from one or more of the plurality of first distances $A_1$-$H_1$. Each individual potential change in distance compared to the original distance can produce determinations of linear strain between two specific strain sensor reference features 40. However, having the ability to determine a plurality of changes in distances between a plurality of strain sensor reference features 40 can facilitate the determination of non-linear strain by not being limited to just two specific strain sensor reference features 40.

In order to determine the non-linear strain at one or more locations of the turbine component 10, the plurality of strain sensor reference features 40 may be read (or otherwise known) at a first time to determine the plurality of first distances $A_1$-$H_1$ and subsequently read at a second time to determine the plurality of second distances $A_2$-$H_2$. Reading can refer to any suitable process for identifying the location of the plurality of strain sensor reference features 40 for determining a plurality of distances A-H there between. For example, reading may occur through optical recognition (e.g., optically recognizing via a camera a visually contrasting material with respect to the base turbine component 10), physical recognition (e.g., identifying ridges, bumps or the like disposed on the base turbine component 10), or the utilization of waves and/or emission based technologies (e.g., utilizing RFID, magnetic fields that react, interact or otherwise excite the plurality of strain sensor reference features 40 in a manner that is distinguishable from the rest of the turbine component 10).

Accordingly, in some embodiments, reading the plurality of strain sensor reference features 40 may comprise scanning at least a portion of the turbine component 10 to detect the plurality of strain sensor reference features 40. Scanning may occur through any suitable mechanism such as optical scanning or the like and may facilitate reading greater areas of the turbine component 10. In some embodiments, reading the plurality of strain sensor reference features 40 may comprise capturing a single image containing the plurality of strain sensor reference features 40. In some embodiments, reading the plurality of strain sensor reference features 40 may comprise capturing a plurality of images that combine to contain the plurality of strain sensor reference features 40.

After the plurality of strain sensor reference features 40 are read (or otherwise known) at a first time and subsequently read at a second time to determine a plurality of first distances $A_1$-$H_1$ between the strain sensor reference features 40 and a plurality of second distances $A_2$-$H_2$ between the strain sensor reference features 40 respectively, the first and second distances may be compared to determine the plurality of non-linear strain measurements between the plurality of strain sensor reference features 40. It should be appreciated that any suitable technique for analyzing the comparison may be utilized to interpret the plurality of non-linear strain measurements. For example, in some embodiments, comparing the plurality of second distances $A_2$-$H_2$ to the plurality of first distances $A_1$-$H_1$ to determine the plurality of non-linear strain measurements between the plurality of strain sensor reference features may comprise a frequency analysis. Such analysis may facilitate the understanding of the relative amount of strain a turbine component 10 may have experienced with respect to a plurality of locations.

Figure 4:
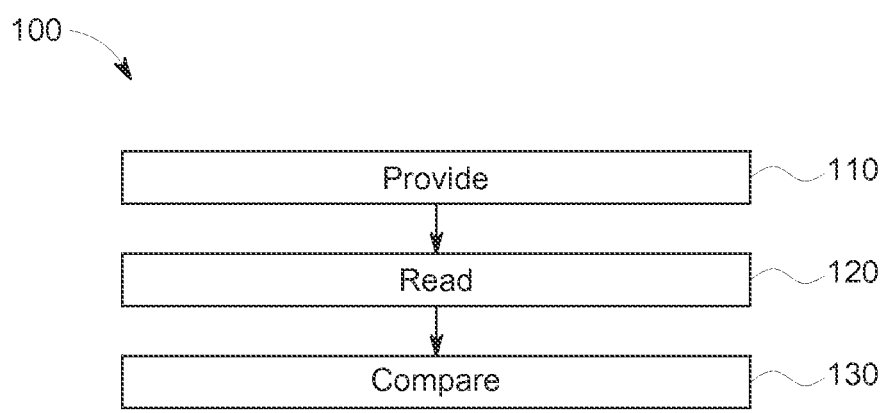
FIG. 4 is an exemplary method for determining strain on a turbine component according to one or more embodiments shown or described herein.

With additional reference to FIG. 4, a method 100 is illustrated for determine strain on a turbine component 10. The method 100 first comprises in step 110 providing the turbine component 10 comprising the plurality of strain sensor reference features 40 disposed along the turbine component 10 separated from one another by a plurality of first distances $A_1$-$H_1$ at a first time. As discussed herein, the plurality of strain sensor reference features 40 can comprise a variety of configurations and be disposed in a variety of locations on the turbine component 10. The method 100 further comprises in step 120 reading the plurality of strain sensor reference features 40 at a second time to determine the plurality of second distances $A_2$-$H_2$ between the plurality of strain sensor reference features 40. Reading can occur through any suitable means as discussed herein that facilitates the identification of the plurality of strain sensor reference features 40 from the turbine component 10.

The method 100 further comprises in step 130 comparing the plurality of second distances $A_2$-$H_2$ to the plurality of first distances $A_1$-$H_1$ to determine the plurality of non-linear strain measurements between the plurality of strain sensor reference features 40. It should be appreciated that the plurality of first distances $A_1$-$H_1$ may initially have been read at the first time (such as by the same or a different reader that is used at the second time), or may already be known based on their original placement/deposition.

Figure 5:
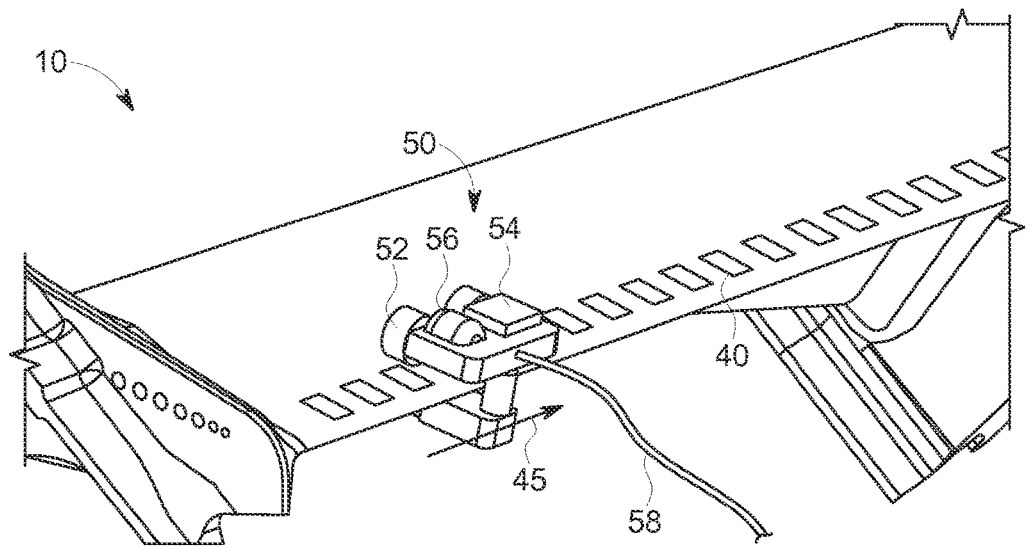
FIG. 5 is a perspective view of a traversable strain sensor reader on a turbine component according to one or more embodiments shown or described herein.
Figure 6:
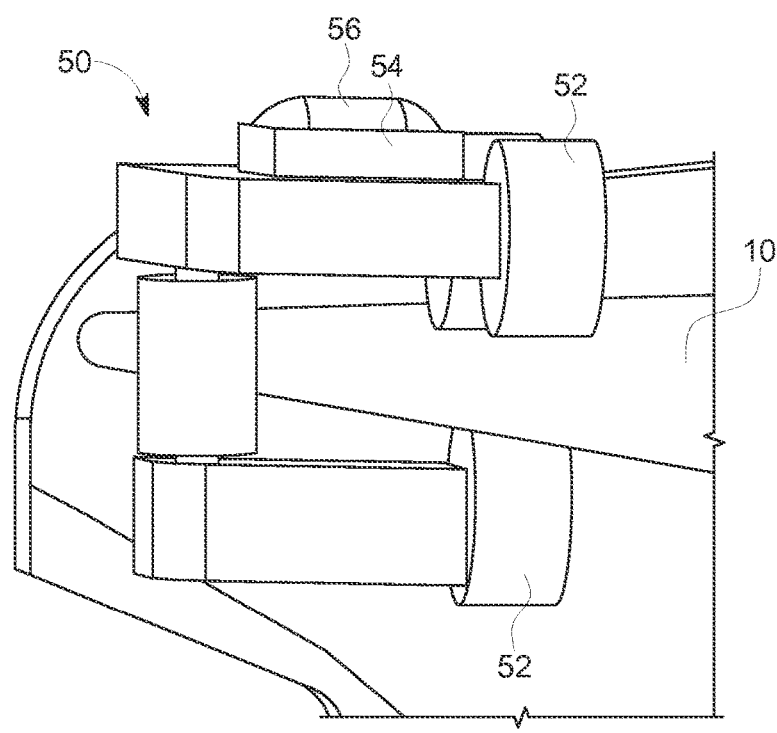
FIG. 6 is a front view of the traversable strain sensor reader for FIG. 5 according to one or more embodiments shown or described herein; and, FIG. 7 is another exemplary method for determining strain on a turbine component using a traversable strain sensor reader according to one or more embodiments shown or described herein.

Referring now to FIGS. 5 and 6, in even some embodiments, a traversable strain sensor reader 50 may be utilized for reading the plurality of strain sensor reference features 40 on the turbine component 10. The traversable strain sensor reader 50 may generally comprise a traversing system 52 and a reader 54.

The traversing system 52 can be configured to traverse the traversable strain sensor reader 50 along at least a portion of the turbine component 10, such as the portion comprising at least a portion of the plurality of strain sensor reference features 40. In some embodiments, the traversing system 52 may comprise a plurality of wheels that ride the exterior surface 11 of the turbine component. For example, in some embodiments, the traversing system 52 may comprise one or more wheels that contact a first surface of the turbine component 10, and one or more wheels that contact a second surface of the turbine component 10, such that the traversing system 52 essentially clamps the overall traversable strain sensor reader 50 onto the turbine component 10. Such embodiments may particularly help facilitate the reading of strain sensor reference features 40 that are proximate an edge of the turbine component 10 (e.g., training edge 15 or leading edge 16).

In other embodiments, the traversing system 52 may comprise any other suitable mechanism for traversing the traversable strain sensor reader 50 along at least a portion of the turbine component 10. For example, in some embodiments, the traversing system 52 may contact the exterior surface 11 of the turbine component 10. In other embodiments, the traversing system 10 may traverse the traversable strain sensor reader along at least a portion of the turbine component 10 without contacting the exterior surface 11 of the turbine component. For example, the traversing system 10 may contact an adjacent turbine component, utilize a guide, scaffold or gantry to traverse over the turbine component 10, or utilize any other suitable mechanism for traversing the traversable strain sensor reader 50 along at least a portion of the turbine component 10.

Moreover, in some embodiments, the traversing system 52 may comprise a motorized traversing system configured to propel the traversable strain sensor reader 50 along at least a portion of the turbine component 10. In other embodiments, the traversing system 52 may comprise a non-motorized traversing system that merely guides or assists with an operator induced traversing motion. For example, the traversing system 52 may comprise non-motorized wheels and/or a guide arm that contacts a portion of the turbine component 10 (e.g., an edge of the turbine component 10) to control the position of the traversable strain sensor reader 50 as it is moved along the turbine component 10.

Still referring to FIGS. 5 and 6, the reader 54 of the traversable strain sensor reader 50 can be configured to read at least a portion of the plurality of strain sensor reference features 40 while the traversing system 52 traverses the traversable strain sensor reader 50 along at least the portion of the turbine component 10. The reader 54 may thereby comprise any suitable system to identify the plurality of strain sensor reference features 40 and may depend on the specific type of material and/or configuration of the plurality of strain sensor reference features 40.

For example, in some embodiments, the reader 54 may comprise a camera to facilitate the optical recognition of the plurality of strain sensor reference features 40 (e.g., any material that potentially visually contrasts with the turbine component 10). In some embodiments, the reader 54 may comprise a surface metrology reader to facilitate the physical recognition of the plurality of strain sensor reference features 40 (e.g., ridges, bumps or the like disposed on the base turbine component 10). In even some embodiments, the reader 54 may comprise an energy radiator and/or collector to facilitate the recognition of the plurality of strain sensor reference features 40 that respond and/or emit different energy than the turbine component 10. For example, such energy radiator and/or collectors may incorporate x-ray systems, CT scans, ultrasounds, radiation detectors or the like depending on the type and relative positioning of the plurality of strain sensor reference features 40.

Still referring to FIGS. 5 and 6, in some embodiments, the traversable strain sensor reader 50 may further comprise one or more additional components. For example, in some embodiments, the traversable strain sensor reader 50 may comprise a location system 56 configured to identify the location of the traversable strain sensor reader 50 on the turbine component 10 while the reader 54 reads the at least portion of the plurality of strain sensor reference features 40. For example, in some embodiments, each of the plurality of strain sensor reference features 40 may comprise self-identifying indicia. Such indicia may allow the operator to reference each individual strain sensor reference feature 40 to understand specific information such as its original position. However, in some embodiments, the location system 56 may alternatively or additionally be utilized to reference which strain sensor reference feature 40 is which based on its relative location on the turbine component 10. For example, the location system 56 may comprise a device for measuring distance traveled by the traversable strain sensor reader 50 such as an odometer type device. If the traversable strain sensor reader 50 starts each traversing path from the same location, the location system may utilized to identify each read/identified strain sensor reference feature 40 by correlating it with the relative distance traveled as measured by the odometer type device. It should be appreciated that the location system 56 may comprise any other additional or alternative system such as, but not limited to, motion capture technology, triangulation technology, encoder technology (e.g., optical encoder) or any other suitable technology.

In even some embodiments, the traversable strain sensor reader 50 may comprise a communication link 58 configured to communicate data from the reader (e.g., images of strain sensor reference features and/or distances there between) to an external device for determination of the location of one or more strain sensor reference features 40, distances A-H, change of distances, strain, or any other information. For example, in some embodiments, the communication link 58 may comprise a wired connection to another device (as illustrated in FIG. 5). In some embodiments, the communication link 58 may comprise any wireless communication technology such as Bluetooth. In even some embodiments, the communication link 58 may comprise a communication port that facilitates a removable connection link for transferring data (e.g., USB). Such embodiments may allow for the analysis of the plurality of strain sensor reference features 40 to occur on the traversable strain sensor reader 50, via a separate device (e.g., a local computer or cloud network), or combinations thereof.

Figure 7:
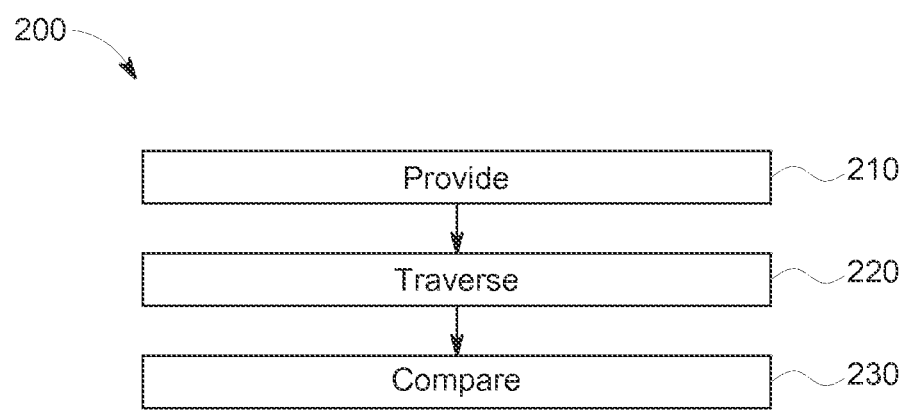

Referring now to FIG. 7, another method 200 is illustrated for determining strain on a turbine component 100 utilizing the traversable strain sensor reader 50. The method 200 first comprises in step 210 providing the turbine component 10 comprising the plurality of strain sensor reference features 40 disposed along the turbine component 10 separated from one another by a plurality of first distances $A_1$-$H_1$ at a first time. As discussed herein, the plurality of strain sensor reference features 40 can comprise a variety of configurations and be disposed in a variety of locations on the turbine component 10. The method 200 further comprises in step 220 traversing a traversable strain sensor reader 50 along at least a portion of the turbine component 10 at a second time to read the plurality of strain sensor reference features 40 separated from one another by the plurality of second distances $A_2$-$H_2$ at the second time. As discussed herein, traversing can be accomplished through a variety of mechanisms. Moreover, reading can occur through any suitable means as discussed herein that facilitates the identification of the plurality of strain sensor reference features 40 from the turbine component 10.

The method 200 further comprises in step 230 comparing the plurality of second distances $A_2$-$H_2$ to the plurality of first distances $A_1$-$H_1$ to determine the plurality of non-linear strain measurements between the plurality of strain sensor reference features 40. It should be appreciated that the plurality of first distances $A_1$-$H_1$ may initially have been read at the first time (such as by the same or a different traversable strain sensor reader 50 reader that is used at the second time), or may already be known based on their original placement/deposition.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for determining strain on a gas turbine component:
    providing the gas turbine component comprising a plurality of strain sensor reference features disposed along the gas turbine component separated from one another by a plurality of first distances at a first time;

reading the plurality of strain sensor reference features at a second time to determine a plurality of second distances between the plurality of strain sensor reference features; and, comparing the plurality of second distances to the plurality of first distances to determine a plurality of non-linear strain measurements between the plurality of strain sensor reference features.

2. The method of claim 1, wherein the plurality of strain sensor reference features comprises at least four strain sensor reference features.

3. The method of claim 2, wherein the plurality of non-linear strain measurements comprises at least three strain measurements.

4. The method of claim 1, wherein the plurality of strain sensor reference features are disposed on an exterior surface of the gas turbine component.

5. The method of claim 1, wherein the plurality of strain sensor reference features are disposed along a predetermined path.

6. The method of claim 5, wherein the predetermined path is a non-linear pre-determined path.

7. The method of claim 5, wherein the predetermined path is substantially parallel to a trailing edge of the gas turbine component.

8. The method of claim 5, wherein the predetermined path covers at least 50% of a length of the gas turbine component.

9. The method of claim 5, wherein the predetermined path covers at least 50% of a length of an airfoil section of the gas turbine component.

10. The method of claim 5, wherein the plurality of strain sensor reference features are at least initially substantially uniformly distributed along the predetermined path.

11. The method of claim 1, wherein reading the plurality of strain sensor reference features comprises scanning at least a portion of the gas turbine component to detect the plurality of strain sensor reference features.

12. The method of claim 1, wherein reading the plurality of strain sensor reference features comprises capturing a single image containing the entire plurality of strain sensor reference features.

13. The method of claim 1, wherein comparing the plurality of second distances to the plurality of first distances to determine the plurality of non-linear strain measurements between the plurality of strain sensor reference features comprises a frequency analysis.

* * * * *